US008253384B2

United States Patent
Chen

(10) Patent No.: US 8,253,384 B2
(45) Date of Patent: Aug. 28, 2012

(54) ELECTRONIC DEVICE HAVING POWER MANAGEMENT ASSEMBLY

(75) Inventor: Chun-Po Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 306 days.

(21) Appl. No.: 12/781,833

(22) Filed: May 18, 2010

(65) Prior Publication Data
US 2011/0234174 A1 Sep. 29, 2011

(30) Foreign Application Priority Data
Mar. 24, 2010 (CN) .......................... 2010 1 0131558

(51) Int. Cl.
*H02J 7/04* (2006.01)
*H02J 7/00* (2006.01)
*G06F 1/00* (2006.01)

(52) U.S. Cl. ........ 320/137; 320/162; 713/300; 713/310; 713/340

(58) Field of Classification Search .................. 320/137, 320/162
See application file for complete search history.

(56) References Cited

U.S. PATENT DOCUMENTS

| 7,930,571 B2 * | 4/2011 | Sathath et al. ................ 713/310 |
| 2005/0129385 A1 * | 6/2005 | Speasl et al. .................... 386/46 |
| 2011/0016333 A1 * | 1/2011 | Scott et al. .................... 713/300 |

* cited by examiner

*Primary Examiner* — M'Baye Diao
(74) *Attorney, Agent, or Firm* — Altis Law Group, Inc.

(57) ABSTRACT

An electronic device includes a power cable, a host, a rechargeable battery, and a power management assembly. The power cable is configured for electrically coupling an external power supply to the electronic device. The rechargeable battery is electrically coupled to the host. The power management assembly is electrically coupled to the host and the rechargeable battery. The power management assembly is configured for controlling drawing the maximum rated power of the electronic device from the external power supply through the power cable as the power management assembly is being used, and controlling the host to switch on a power-saving mode, and increase current flowing to the rechargeable battery when the host works in the power-saving mode.

17 Claims, 2 Drawing Sheets

ELECTRONIC DEVICE HAVING POWER MANAGEMENT ASSEMBLY

BACKGROUND

1. Technical Field

The present embodiment relates to electronic devices and, particularly, to an electronic device having a power management assembly.

2. Description of Related Art

Electronic devices, such as hand-held computers, usually can be powered by rechargeable batteries. However, currently, there are no power management assemblies in electronic devices for controlling a power supply to recharge the rechargeable batteries quickly. Therefore, charging efficiency for the rechargeable batteries of those electronic devices is less than satisfactory.

Therefore, it is desirable to provide an electronic device having a power management assembly which can overcome the above-mentioned problems.

BRIEF DESCRIPTION OF THE DRAWINGS

Many aspects of the present electronic device having a power management assembly can be better understood with reference to the accompanying drawings. The components in the drawings are not necessarily drawn to scale, the emphasis instead being placed upon clearly illustrating the principles of the present electronic device having a power management assembly. Moreover, in the drawings, like reference numerals designate corresponding parts throughout the several views, and all the views are schematic.

DETAILED DESCRIPTION

Embodiments of the disclosure will now be described in detail below and with reference to the drawings.

Figure 1:
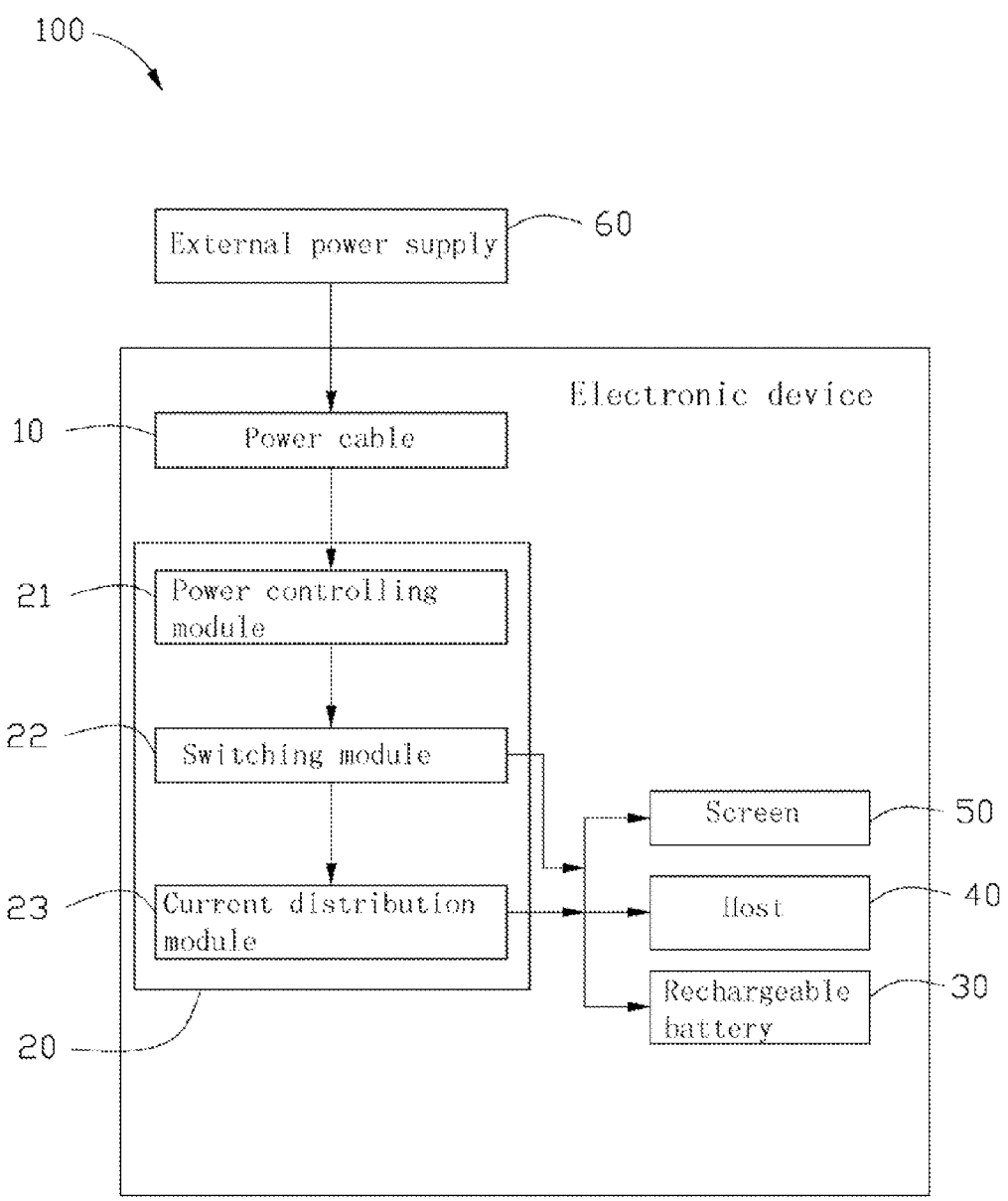
FIG. 1 is a function block diagram of the electronic device having a power management assembly according to an exemplary embodiment.
Figure 2:
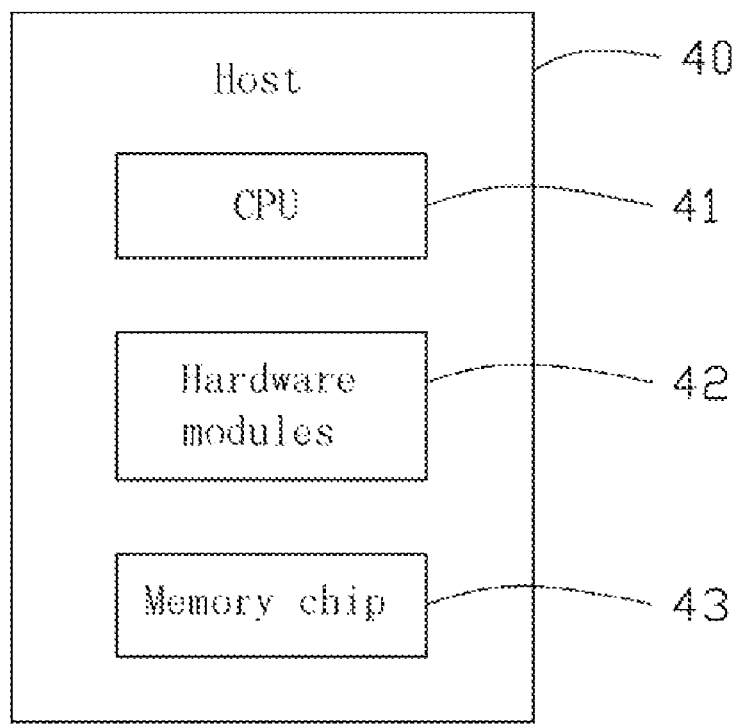
FIG. 2 is a function block diagram of a host of the electronic device of FIG. 1.

Referring to FIGS. 1-2, an electronic device 100 such as a hand-held computer, according to an exemplary embodiment, includes a power cable 10, a power management assembly 20, a rechargeable battery 30, a host 40, and a screen 50. The rechargeable battery 30, the host 40, and the screen 50 are all electrically coupled to the power management assembly 20. The power management assembly 20 includes a power controlling module 21, a switching module 22, and a current distribution module 23.

The power cable 10 electrically couples an external power supply 60 to the electronic device 100. In particular, the power cable 10 couples the external power supply 60 to the power controlling module 21.

The power controlling module 21 is configured for drawing the maximum rated power of the electronic device 100 from the external power supply 60 through the power cable 10 when the rechargeable battery 30 is being charged and the power management assembly 20 is being used. In this embodiment, as an example, the maximum rated power of the electronic device 100 is about 90 watts and the corresponding maximum rated current is about 2 amperes.

The switching module 22 is configured for switching an operating mode of the host 40 and the screen 50 between a power-saving mode and a normal mode. In particular, when the rechargeable battery 30 is being charged, the host 40 and the screen 50 are switched into the power-saving mode. The host 40 includes a central processing unit (CPU) 41, a plurality of hardware modules 42, and at least one memory chip 43. The switching module 22 switches the CPU 41, the hardware modules 42, and the at least one memory chip 43 of the host 40 and the screen 50 into the power-saving mode by slowing a working frequency of the host 40 and decreasing a brightness of the screen 50. In this embodiment, the hardware modules 42 may include, a hard disk, an audio card, a display card, and so on.

The current distribution module 23 is electrically coupled to the rechargeable battery 30, the host 40, and the screen 50. The current distribution module 23 is configured for increasing current flowing to the rechargeable battery 30 when the host 40 and the screen 50 work in the power-saving mode.

Unlike a conventional electronic device, the power controlling module 21 of the power management assembly 20 controls the power cable 10 to input the maximum rated power to the electronic device 100, at the same time, both the host 40 and the screen 50 work in a power-saving mode, an operating current distributed to the host 40 and the screen 50 by the current distribution module 23 become lower, the saved current of the host 40 and the screen 50 is distributed to the rechargeable battery 30, as a result, there is more current distributed to the rechargeable battery 30, to achieve the purpose of fast charging the rechargeable battery 30.

The electronic device 100 may also include a start button (not shown). When a user presses the start button, the electronic device 100 starts the power management assembly 20. If the user presses the start button again, the power management assembly 20 turns off.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electronic device comprising:
a power cable configured for electrically coupling an external power supply to the electronic device;
a host;
rechargeable battery electrically coupled to the host; and
a power management assembly electrically coupled to the host and the rechargeable battery, wherein the power management assembly is configured for controlling drawing the maximum rated power of the electronic device from the external power supply through the power cable as the power management assembly is being used, and controlling the host to switch on a power-saving mode, and increase a current flowing to the rechargeable battery when the host works in the power-saving mode.

2. The electronic device of claim 1, wherein the power management assembly comprises a power controlling module configured for drawing the maximum rated power of the electronic device from the external power supply.

3. The electronic device of claim 2, wherein the power management assembly further comprises a switching module configured for switching an operating mode of the host between the power-saving mode and a normal mode, when the rechargeable battery is being charged, the host is switched on the power-saving mode.

4. The electronic device of claim 3, wherein the power management assembly further comprises a current distribution module configured for increasing a current flowing to the rechargeable battery when the host works in the power-saving mode.

5. The electronic device of claim 1, wherein the host comprises a CPU, a plurality of hardware modules, and at least one memory chip, the CPU, the hardware modules and the at least one memory chip are electrically coupled to the current distribution module.

6. The electronic device of claim 4, wherein the switching module switches the CPU, the hardware modules, and the at least one memory chip into the power-saving mode by slowing a working frequency of the CPU, the hardware modules, and the at least one memory chip.

7. The electronic device of claim 1, wherein the maximum rated power is about 90 watts.

8. The electronic device of claim 1, wherein the maximum rated current is about 2 amperes.

9. An electronic device comprising:
a power cable configured for electrically coupling an external power supply to the electronic device;
a host;
a screen;
a rechargeable battery electrically coupled to the host; and
a power management assembly electrically coupled to the host, the screen and the rechargeable battery, wherein the power management assembly is configured for controlling drawing the maximum rated power of the electronic device from the external power supply through the power cable as the power management assembly is being used, and controlling the host and the screen to switched on a power-saving mode, and increase a current flowing to the rechargeable battery when the host and the screen work in the power-saving mode.

10. The electronic device of claim 9, wherein the power management assembly comprises a power controlling module configured for drawing the maximum rated power of the electronic device from the external power supply.

11. The electronic device of claim 10, wherein the power management assembly further comprises a switching module configured for switching an operating mode of the host between the power-saving mode and a normal mode, when the rechargeable battery is being charged, the host is switched on the power-saving mode.

12. The electronic device of claim 11, wherein the power management assembly further comprises a current distribution module configured for increasing a current flowing to the rechargeable battery when the host works in the power-saving mode.

13. The electronic device of claim 9, wherein the host comprises a CPU, a plurality of hardware modules, and at least one memory chip, the CPU, the hardware modules and the at least one memory chip are electrically coupled to the current distribution module.

14. The electronic device of claim 13, wherein the switching module switches the CPU, the hardware modules, and the at least one memory chip into the power-saving mode by slowing a working frequency of the CPU, the hardware modules, and the at least one memory chip.

15. The electronic device of claim 9, wherein the maximum rated power is about 90 watts.

16. The electronic device of claim 9, wherein the maximum rated current is about 2 amperes.

17. The electronic device of claim 9, wherein the switching module switches the screen into the power-saving mode by decreasing a brightness of the screen.

* * * * *